US007384019B2

(12) United States Patent
Choi

(10) Patent No.: US 7,384,019 B2
(45) Date of Patent: Jun. 10, 2008

(54) FLAT PANEL DISPLAY

(75) Inventor: Chang Woo Choi, Daegu (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 11/202,187

(22) Filed: Aug. 12, 2005

(65) Prior Publication Data

US 2006/0038104 A1 Feb. 23, 2006

(30) Foreign Application Priority Data

Aug. 17, 2004 (KR) ...................... 10-2004-0064611

(51) Int. Cl.
*A47F 5/12* (2006.01)
(52) U.S. Cl. ...................... 248/136; 248/920; 248/923; 361/681
(58) Field of Classification Search ................ 248/371, 248/372.1, 407, 408, 411, 423, 920, 923, 248/222.51, 222.52, 224.8, 225.11, 136, 150; 348/825, 836, 838; 361/681
See application file for complete search history.

(56) References Cited

U.S. PATENT DOCUMENTS

| 4,438,458 | A | * | 3/1984 | Munscher | ................... 348/838 |
| 5,946,055 | A | * | 8/1999 | Rosen | ........................ 348/837 |
| 6,059,255 | A | * | 5/2000 | Rosen et al. | ................. 292/140 |
| 6,822,857 | B2 | * | 11/2004 | Jung et al. | ................... 361/681 |
| 6,915,995 | B2 | * | 7/2005 | Gillespie | ................. 248/278.1 |
| 2001/0055196 | A1 | | 12/2001 | Anzai et al. | |
| 2004/0012509 | A1 | | 1/2004 | Chen | |
| 2004/0084586 | A1 | | 5/2004 | Gillespie | |

FOREIGN PATENT DOCUMENTS

| EP | 1 312 851 A2 | 5/2003 |
| KR | 10-2004-0032160 A | 4/2004 |
| KR | 10-2004-0032278 A | 4/2004 |
| KR | 1020040032160 | 4/2004 |
| KR | 1020040032278 | 4/2004 |
| WO | WO 2005/109151 A1 | 11/2005 |

OTHER PUBLICATIONS

European Search Report dated May 7, 2007.

* cited by examiner

*Primary Examiner*—A. Joseph Wujciak, III
(74) *Attorney, Agent, or Firm*—Ked & Associates, LLP

(57) ABSTRACT

A flat panel display that has a stand is designed to be easily fixed onto a base without a separate immobilization device. The flat panel display includes a display screen, a base installed on a bottom side, and a stand having an upper end pivotably connected to a rear side of the display screen, and a lower end pivotably connected to a top surface of the base. A clamping device is movably installed inside the base. The clamping device is configured to fix the stand onto the base when the stand is folded over the base.

20 Claims, 5 Drawing Sheets

FLAT PANEL DISPLAY

This application claims the benefit of the Korean Patent Application No. 10-2004-0064611, filed on Aug. 17, 2004, which is hereby incorporated by reference as if fully set forth herein.

BACKGROUND OF THE INVENTION

1. Field of the Invention

The present invention relates in general to a flat panel display, and more particularly, to a flat panel display that has a stand being easily fixed onto a base without a separate immobilization device.

2. Background of the Related Art

FIG. 1 is a perspective view of a flat panel display according to a related art.

As shown in FIG. 1, the related art flat panel display is largely composed of a main body 1 for outputting images, a stand 2 for supporting the main body 1, and a base 3 installed at the bottom side, for bearing a load of the main body 1 being transferred through the stand 2.

Here, the upper end of the stand 2 is hingeably connected to the rear side of the main body 1 with a first hinge 4, and the lower end of the stand 2 is hingeably connected to the top surface of the base 3 with the second hinge 5. Therefore, when an external force is applied, the main body 1 pivots on the first hinge 4, and the stand 2 pivots on the second hinge 5.

Also, the second hinge 5 is provided with a torsion spring 5a. Therefore, when the stand 2 pivots towards the top surface of the base 3, the torsion spring 5a supplies an elastic force in the opposite direction, offsetting a torque generated by the weight of the main body 1.

As described above, the main body 1 and the stand 2 in the flat panel display of the related art are built to be able to pivot on the first and second hinges 4 and 5 by an external force. Thus, a user can apply force to the main body 1 and adjust its inclination angle. That is, to get a desired inclination angle of the main body 1, the user may pivot the main body 1 on the first hinge 4 or pivot the stand 2 on the second hinge 5.

FIG. 2 is a side view illustrating a case where the stand of the flat panel display of FIG. 1 is folded over the base.

As can be seen in FIG. 2, by pivoting the main body 1 and the stand 2 on the first and second hinges 4 and 5, the user is able to fold the main body 1 and the stand 2 over the stand 2 and the base 3, respectively.

This structural feature is very useful, especially when the flat panel display is hung on the wall or packed in a carton, in either case the volume of the flat panel display needs to be minimized. To this end, the user pivots the stand 2 on the second hinge 5 to fold it over the base 2 and at the same time, pivots the main body 1 on the first hinge 4 until the main body 1 is in parallel to the base 3 as shown in FIG. 2. Then, the user can hang the flat panel display on the wall using a wall mount or put it into a carton for ease of shipment.

Because the torsion spring 5a tends to cause the stand 2 to pivot up away from the base 3, an external shock could often cause the related art device to unfold from the position shown in FIG. 2. For this reason, a separate immobilization device (not shown), having a U shape, is generally used to fix the stand 2 to the base 3. However, the use of such immobilization device increases the cost of manufacture of the related art flat panel device because it must be separately manufactured. The related art immobilization device could also be somewhat awkward to use. Further, because the flat panel display cannot be hung on the wall or easily packed in a carton without the help of the immobilization device, users must be extra careful not to lose the immobilization device.

SUMMARY OF THE INVENTION

An object of the invention is to solve at least the above problems and/or disadvantages and to provide at least the advantages described hereinafter.

Accordingly, the present invention is directed to an easy-to-fold flat panel display that has a stand that can be easily fixed onto a base without a separate immobilization device. A flat panel display embodying the invention includes: a main body for outputting images; a base installed on a bottom side, for bearing a load of the main body; a stand having an upper end pivotably connected to a rear side of the main body, and a lower end pivotably connected to a top surface of the base; and a clamping device movably installed inside the base, for fixing the stand onto the base when the stand is folded over the base.

Preferably, the display further includes: a first hinge formed on an upper end of the stand, for being connected to the rear side of the main body; and a second hinge formed on a lower end of the stand, for being connected to the top surface of the base.

In some embodiments of the invention, an open space is formed in the middle of the base, and a depth of the open space is equal to a thickness of the stand.

Preferably, the clamping device includes: at least one fixing unit detachably connected to the stand, for moving horizontally; and an operating unit having one end combined with the fixing unit and the other end exposed to outside of the base.

In some embodiments of the invention the clamping device will include at least one fixing groove formed on the upper end of the stand; and at least one protrusion formed on the end of the fixing unit. The protrusion will be configured to be inserted into the fixing groove to fix the stand to the base. Preferably, two fixing grooves will be formed on the upper ends on both sides of the stand, respectively.

The base may include a first guide groove formed along a direction of motion of the fixing unit. In this instance, the protruding portion of the operating unit is exposed through the first guide groove. Preferably, the fixing unit will also include a second guide groove, and a protrusion formed inside the base is inserted into the second guide groove. This arrangement helps to guide the movement of the fixing unit.

Preferably, the base further includes a stopper installed on a travel path of the operating unit. The stopper would be configured to restrict motion of the operating unit. In some embodiments, the stopper is a leaf spring that elastically contacts one side of the operating unit. Preferably, the base would include a mount groove with a predetermined space for installation of the stopper.

It is to be understood that both the foregoing general description and the following detailed description of the present invention are exemplary and explanatory and are intended to provide further explanation of the invention as claimed. Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements, and wherein.

DETAILED DESCRIPTION OF PREFERRED EMBODIMENTS

Reference will now be made in detail to the preferred embodiments of the present invention, examples of which are illustrated in the accompanying drawings.

Figure 1:
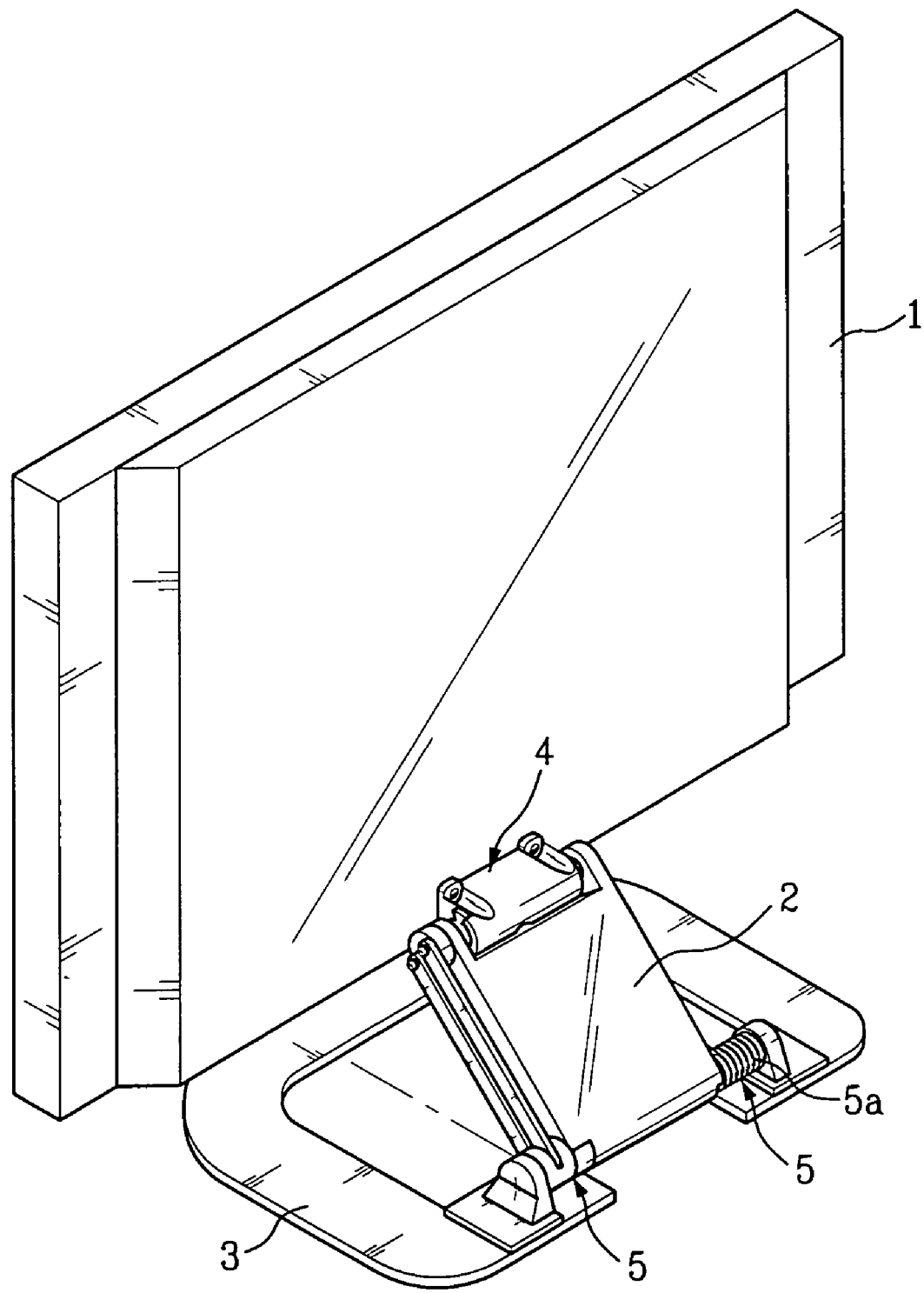
FIG. 1 is a perspective view of a flat panel display according to a related art.
Figure 2:
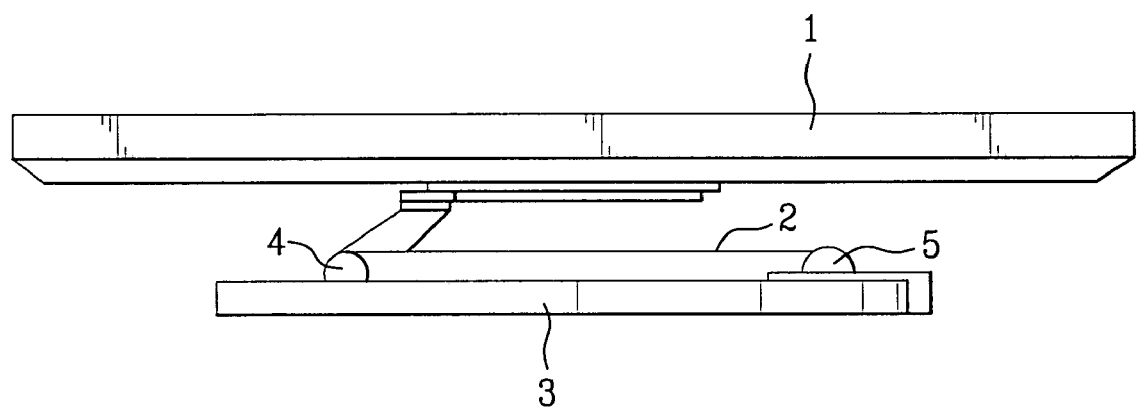
FIG. 2 is a side view illustrating a case where a stand of the flat panel display of FIG. 1 is folded over a base.
Figure 3:
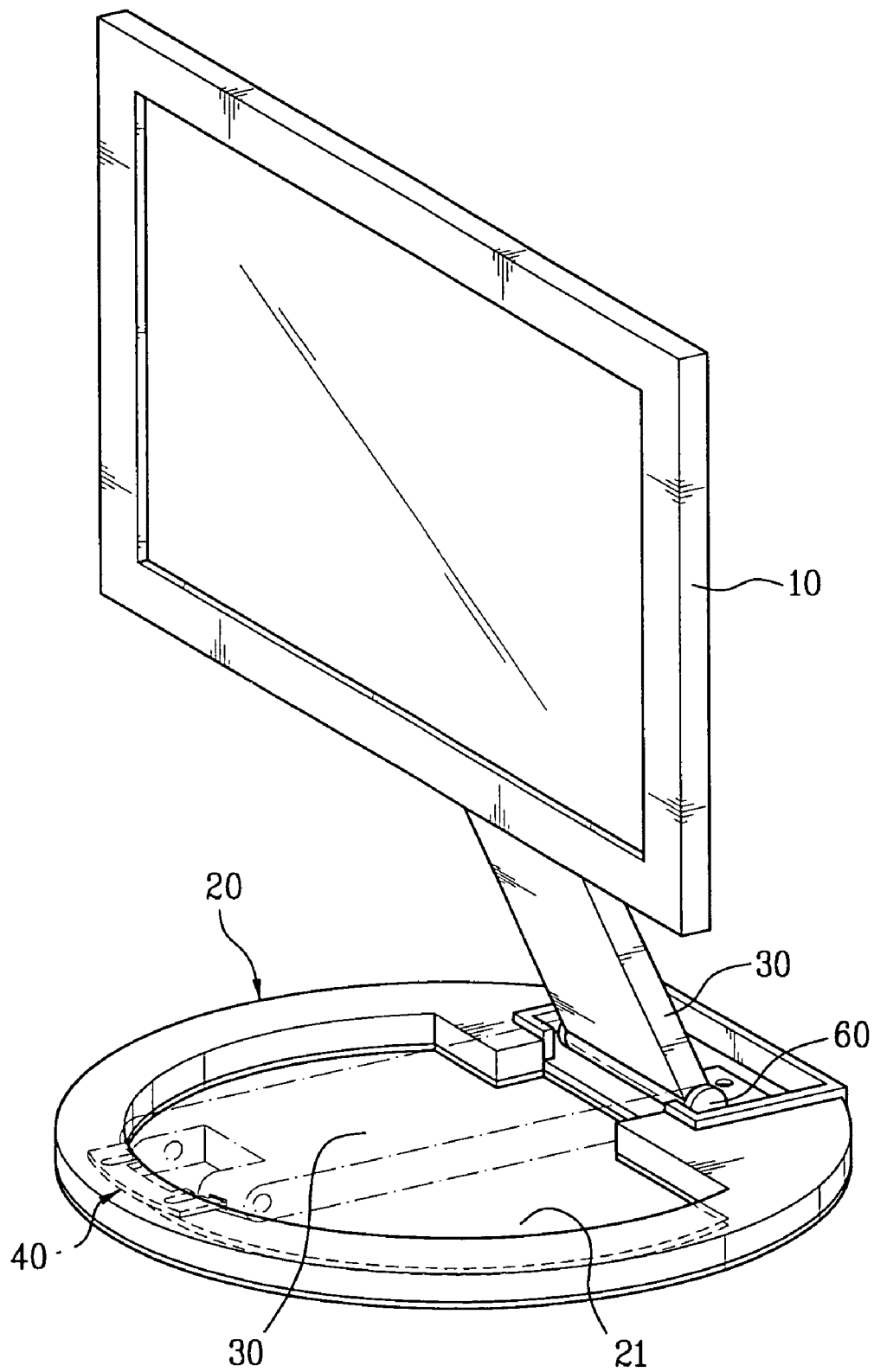
FIG. 3 is a perspective view of a flat panel display according to the present invention.

FIG. 3 is a perspective view of a flat panel display according to the present invention. As shown in FIG. 3, the flat panel display of the present invention includes a main body 10, a base 20, a stand 30, and a clamping device 40. The main body 10 outputs images, and the base 20 is installed on the bottom surface, bearing a load of the main body 10. An upper end of the stand 30 is pivotably connected to the rear side of the main body 10, and a lower end of the stand 30 is pivotably connected to the top surface of the base 20.

More specifically, a first hinge 50 (please refer to FIG. 4) connected to the rear side of the main body 10 is provided on the upper end of the stand 30, and a second hinge 60 connected to the top surface of the base 20 is provided on the lower end of the stand 30. Therefore, when an external force is applied, the main body 10 pivots on the first hinge 50, and the stand 30 pivots on the second hinge 60.

The clamping device 40 is movably installed in the base 20. When the stand 30 is folded over the base 20, the clamping device 40 is coupled to the stand 30 to fix it onto the base 20. In other words, when a user folds the stand 30 over the base 20 in order to hang the flat panel display on the wall or to pack it into a carton, the clamping device 40 is coupled to the stand 30 to make sure that the stand 30 is firmly fixed onto the base 20.

In addition, an open space 21 may be formed in the middle of the base 20. Therefore, when the stand 30 is folded over the base 20, it is inserted into the open space 21 or folded down along the dotted lines in FIG. 3. Here, it is preferable to make the depth of the open space 21, that is, the thickness of the base 20, approximately equal to the thickness of the stand 30. In doing so, the base 30 can be completely inserted into the open space 21 and thus, the total lateral thickness of the flat panel display is reduced.

To elaborate on the above, in the related art, when the stand 30 is folded over the base 20, the lateral thickness of the flat panel display equals a sum of the thicknesses of the main body 10, the stand 30 and the base 20. However, in the present invention, when the stand 30 is completely inserted into the open space 21 of the base 20, the total lateral thickness of the flat panel display is reduced by the thickness of the stand 30. Therefore, if seen from the side, the stand 30 does not stick out above the base 20, so that the total (lateral) thickness of the flat panel display becomes equal to the sum of the thicknesses of the main body 10 and base 20.

The clamping device 40 will now be described in greater detail below, in reference to the drawings.

Figure 4:
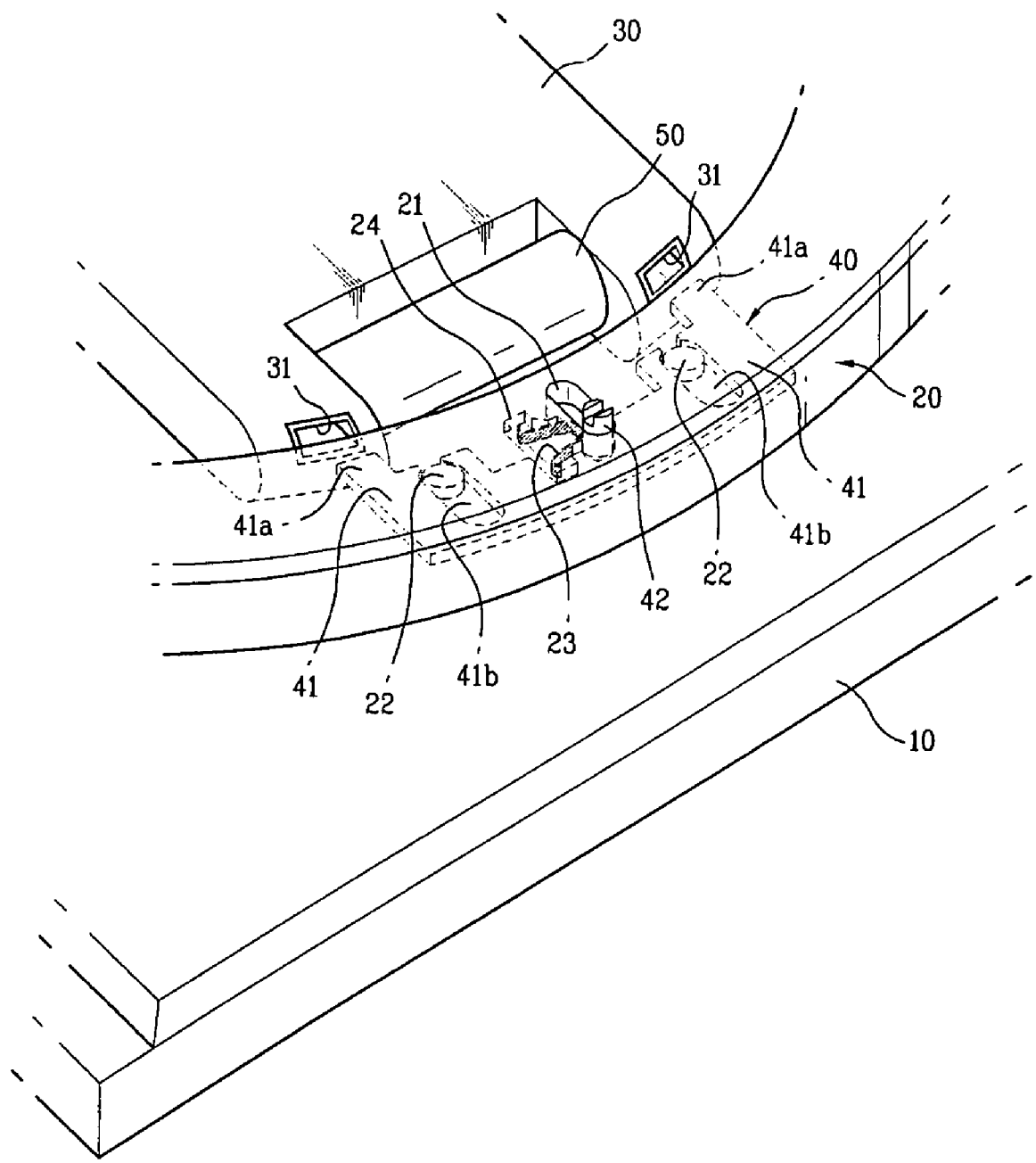
FIG. 4 is a perspective view illustrating a case where a stand of a flat panel display of the present invention is folded over a base.
Figure 5:
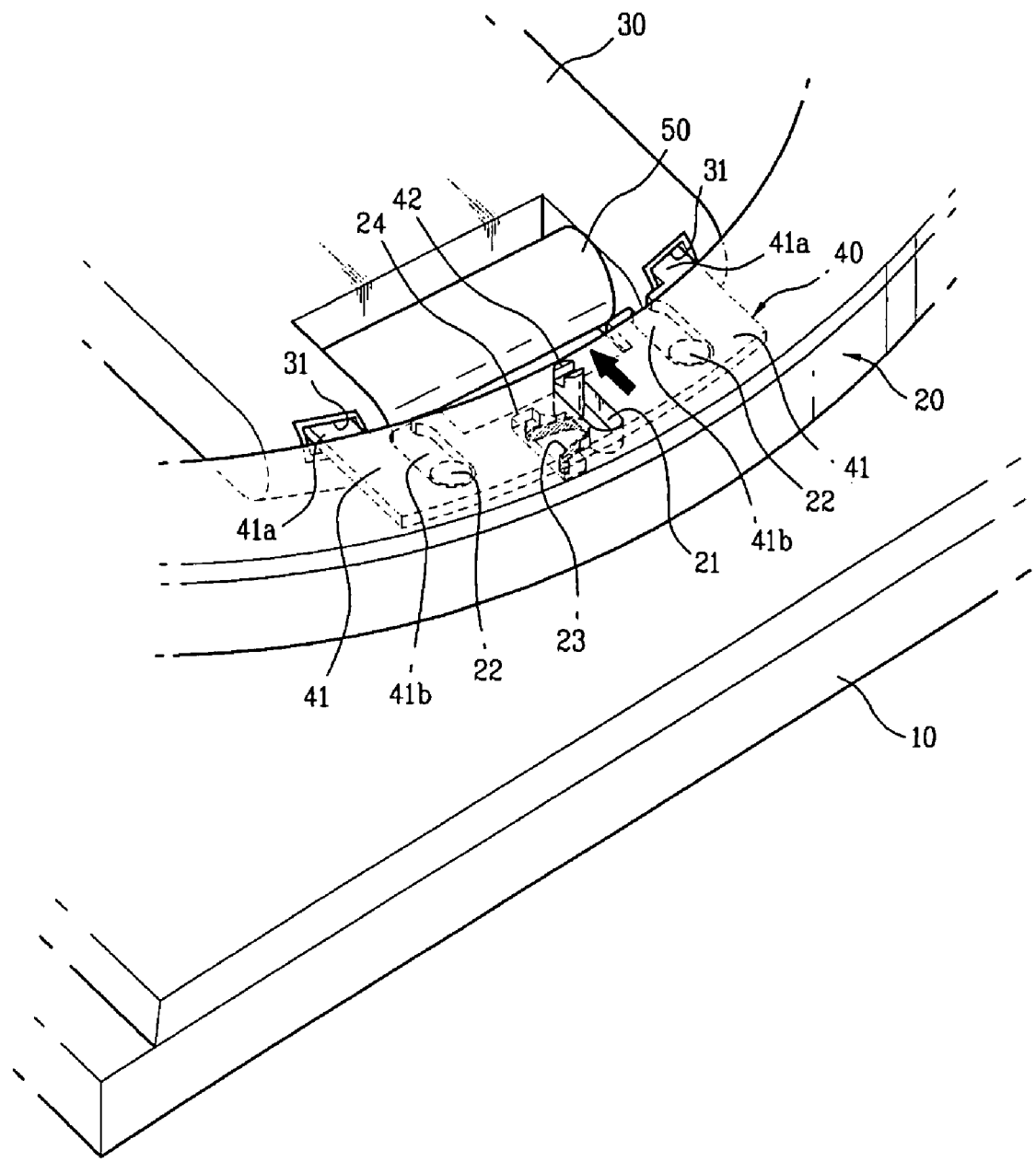
FIG. 5 is a perspective view illustrating a case where a stand of a flat panel display of the present invention is fixed onto a base through a clamping device.

FIG. 4 is a perspective view illustrating a case where the stand of the flat panel display of the present invention is folded over the base. FIG. 5 is a perspective view illustrating a case where the stand of the flat panel display of the present invention is fixed onto the base through the clamping device As shown in FIGS. 4 and 5, the clamping device 40 moves in a horizontal direction, and includes at least one fixing unit 41 which is configured to be detachably connected to the stand 30. An operating unit 42 has one end coupled to the fixing unit 41 and another end that is exposed outside of the base 20.

Here, the clamping device 40 moves horizontally when the user applies a force to the exposed end of the operating unit 42 outside of the base 20. When the operating unit 42 moves in the horizontal direction by the applied force from the user, the fixing units 41, which are attached to the operating unit 42, also move horizontally.

In preferred embodiments of the invention, the protruding end of the operating unit 42 is exposed outside of the lower portion of the base 20. This is because if the end of the operating unit 42 is exposed at the upper portion of the base 20, the appearance of the flat panel display may be less pleasing.

Also, at least one fixing groove 31 is formed on the upper end of the stand 30. In correspondence to the fixing groove 31, at least one protrusion 41a, which is to be inserted into the fixing groove 31, is formed on each fixing unit 41. Thus, when an external force is applied to the operating unit 42, as shown in FIG. 5, the protrusion 41a is inserted into the fixing groove 31, so that the stand 30 can be securely fixed onto the base 20.

Preferably, separate fixing grooves 31 are formed on both sides of the stand 30. In this case, protrusions 41a are formed on each fixing unit 41 so that they can be inserted into the respective fixing grooves 31. As a result, the stand 30 can be fixed onto the base 20 even more stably.

Moreover, a first guide groove 21 may be formed on the base 20 along the direction of the motion of the fixing unit 41. Thus, the protruding end of the operating unit 42 is exposed through the first guide groove 21.

The first guide groove 21 is used not only for exposing the end of the operating unit 42, thereby enabling the user to apply a force (or press) the end, but also for guiding the motion of the operating unit 42 caused by the force from the user. For instance, when the user applies an external force to the exposed end of the operating unit 42 through the first guide groove 21, the operating unit 42 moves along the direction of the first guide groove 21.

In addition, a second guide groove 41b may be formed on each fixing unit 41. In this case, two protrusions 22, to be inserted into the second guide grooves 41b, are formed in the base 20. The second guide grooves 41b together with the protrusions 22 guide the motion of the fixing units 41 to ensure that the fixing units 41 are accurately coupled to the stand 30. In detail, when the fixing units 41 move by an external force applied to the protruding end of the operating unit 42, the protrusions 22 inserted into the second guide grooves 41b guide the fixing units 41, so that the protrusions 41a formed on the fixing units 41 can be accurately inserted into the fixing grooves 31 on the upper end of the stand 30.

Moreover, a stopper 23 may be installed inside the base 20, more specifically, on the travel path of the operating unit 42. The stopper would be designed to restrict the free (or random) motion of the operating unit 42. The stopper 23 provides an elastic force to the operating unit 42 and immobilizes the operating unit 42 if an external force greater than a predetermined level is not applied. In other words, the stopper 23 restricts the motion of the operating unit 42 so as to help the fixing unit 41 maintain its separation or combination status from or with the stand 30 unless the user applies a greater force than the predetermined level.

In some embodiments, the stopper 23 is a leaf spring. In this case, the base 20 should have a space designated as a mounting groove 24 for installation of the leaf spring. To be more specific, one end of the leaf spring would extend into the first guide groove 21 where the operating unit 42 is disposed until it comes in contact with one side of the operating unit 42. If the user pushes the exposed end of the operating unit 42 with his finger or a working tool, the operating unit 42 would move along the first guide groove 21 and compress the leaf spring. If the user applies a greater force than the designated level to the operating unit 42, the operating unit 42 would overcome the elastic force from the leaf spring and move along the first guide groove 21.

When the operating unit 42 completely passes the leaf spring, the leaf spring 105 returns to its original state. Then, the other side of the operating unit 42 would come in contact with the leaf spring again, so that its free motion is restricted thereby.

Provided the user does not apply a greater force than the designated level to the operating unit 42, the stopper 23 is capable of restricting the motion of the operating unit 42, thereby preventing the fixing units 41 from being combined or separated with or from the stand 30, irrespective of the intention of the user.

Needless to say, the stopper 23 is also capable of restricting the motion of the operating unit 42 in the opposite direction.

The following will now describe the operating procedure of the flat panel display according to the present invention.

The user pivots the stand 30 on the second hinge 60 and makes the stand 30 completely fold over the top surface of the base 20 along the dotted lines in FIG. 3. At this time, the stand 30 is inserted into the open space 21 formed in the middle of the base 20. Then, although it is not shown in the drawing, the user pivots the main body 10 on the first hinge 50 until the main body 10 is completely folded over the stand 30.

When the above procedure is completed, the fixing grooves 31 of the stand 30 are aligned with the fixing units 41 of the clamping device 40, as shown in FIG. 4. When the user applies a force to the exposed end of the operating unit 42, the operating unit 42 moves along the first guide groove 21. If the user applies a greater force than the designated level to the operating unit 42, the operating unit 42 overcomes the elastic force from the leaf spring and moves along the first guide groove 21. When the operating unit 42 moves along the first guide groove 21, the fixing units 41 also move with the operating unit 42 in the horizontal direction. Here, the motion of each fixing unit 41 is also guided by the protrusion 22 inserted into the second guide groove 41b. As such, as the fixing units 41 move horizontally, the protrusions 41a formed on the ends of the fixing units 41 are inserted into the fixing grooves 31 of the stand 30. In this manner, the stand 30 can be securely fixed onto the base 20.

At this time, the operating unit 42 is again elastically contacted with the leaf spring. Thus, the stand 30 maintains its fixed state onto the base 20 until the user applies a force to the operating unit 42.

Once the stand 30 is fixed onto the base 20, the user can handle the flat panel display as desired, for example, he can hang the flat panel display on the wall or pack it into a carton for ease of shipment.

If the user wants to release the stand 30 from the base 20, he can simply move the operating unit 42 in the opposite direction from the arrow direction shown in FIG. 5. When he does, the protrusions 41a of the fixing units 41 are withdrawn from the fixing grooves 31, and the stand 30 is gently separated from the base 20.

As explained earlier, the flat panel display of the present invention has the following advantages. First, the stand can be fixed onto the base without using a separate immobilization device, and by simply moving the operating unit. Therefore, the stand fixation can be done very easily. Second, since a separate immobilization device is no longer needed, the burden of manufacture and management of the devices can be taken away. Also, consumers do not have to worry about the loss of the immobilization devices. Further, because an opening is formed in the base, the stand can be inserted into the base to reduce the overall height of the flat panel display relative to related art devices.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A flat panel display, comprising:
 a display screen;
 a base configured to support the display screen;
 a stand coupled between the display screen and the base, wherein an upper end of the stand is pivotably connected to the display screen, and wherein a lower end of the stand is pivotably connected to the base; and
 a clamping device configured to fix the stand with respect to the base when the stand is folded over the base, wherein the damping device comprises:
 at least one fixing groove formed on one of the stand and the base; and
 at least one fixing protrusion which is movably mounted on the other of the stand and the base, wherein each at least one fixing protrusion is configured to be moved into engagement with a corresponding fixing groove to fix the stand with respect to the base.

2. The flat panel display of claim 1, further comprising a panel hinge coupled between the display screen and the stand to allow the display screen to pivot with respect to the stand.

3. The flat panel display of claim 2, further comprising a base hinge coupled between the stand and the base to allow the stand to pivot with respect to the base.

4. The flat panel display of claim 1, further comprising a base hinge coupled between the stand and the base to allow the stand to pivot with respect to the base.

5. The flat panel display of claim 1, wherein an opening is formed in the base, and wherein the opening is configured to receive the stand when the stand is folded over the base.

6. The flat panel display of claim 5, wherein a depth of the opening is approximately equal to a thickness of the stand.

7. The flat panel display of claim 1, further comprising an operating unit that is coupled to the at least one fixing protrusion, wherein movement of the operating unit causes the at least one fixing protrusion to be moved into and out of engagement with a corresponding fixing groove.

8. The flat panel display of claim 7, wherein an operating lever of the operating unit protrudes from the flat panel display such that a user can push the operating lever to cause the operating unit to move.

9. The flat panel display of claim 8, wherein the at least one fixing protrusion and the operating unit are movably mounted on the base, wherein a guide groove is formed in the base, and wherein the operating lever protrudes through and is guided by the guide groove.

10. The flat panel display of claim 9, wherein at least one additional guide groove is formed on the operating unit, wherein at least one guide protrusion is formed on the base, and where each guide protrusion is mounted in a corresponding additional guide groove to guide movement of the operating unit.

11. The flat panel display of claim 9, further comprising a stopper configured to limit movement of the operating unit.

12. The flat panel display of claim 11, wherein the stopper interacts with the operating lever to limit movement of the operating unit.

13. The flat panel display of claim 12, wherein the stopper comprises a leaf spring mounted on the base.

14. The flat panel display of claim 7, further comprising a stopper configured to limit movement of the operating unit.

15. The flat panel display of claim 14, wherein the stopper is configured to hold the operating unit in either a first position wherein the at least one fixing protrusion is not engaged in a corresponding fixing groove or a second position wherein the at least one fixing protrusion is engaged in a corresponding fixing groove.

16. The flat panel display of claim 15, wherein the stopper comprises an elastic member which is configured to be temporarily deformed to allow the operating unit to move between the first and second positions.

17. The flat panel display of claim 16, wherein the stopper comprises a leaf spring.

18. The flat panel display of claim 7, wherein an operating lever of the operating unit protrudes from a lower portion of the base.

19. The flat panel display of claim 7, further comprising:
at least one guide groove formed on one of the operating unit and the base; and
at least one guide protrusion formed on the other of the operating unit and the base, wherein each at least one guide protrusion is received in a corresponding guide groove to guide movement of the operating unit with respect to the base.

20. The flat panel display of claim 1, wherein the at least one fixing groove is formed on the stand, and wherein the at least one fixing protrusion is mounted on the base.

* * * * *